H. A. OGLE.
COILED SPRING ATTACHING MEANS.
APPLICATION FILED MAY 6, 1912.
1,042,718.
Patented Oct. 29, 1912.
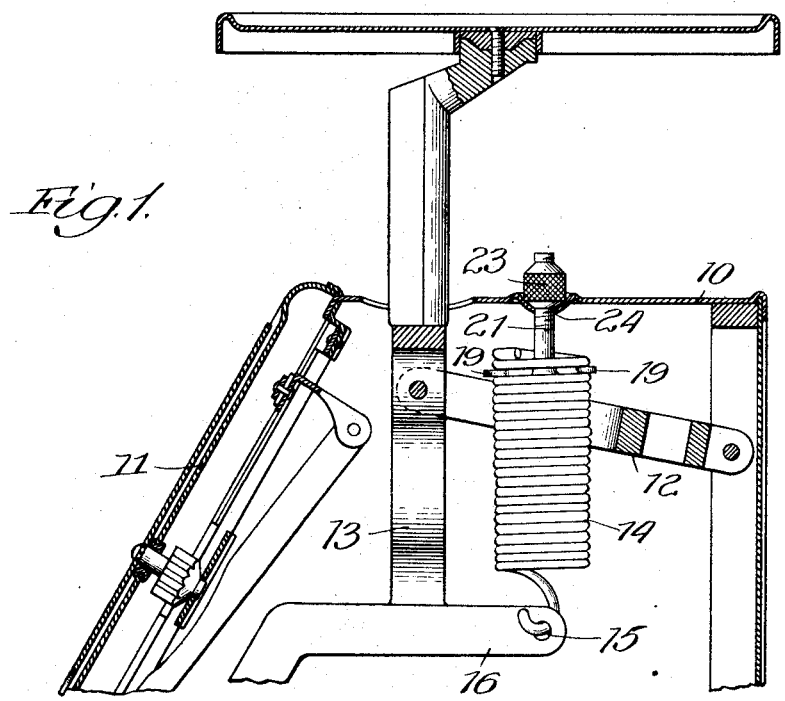
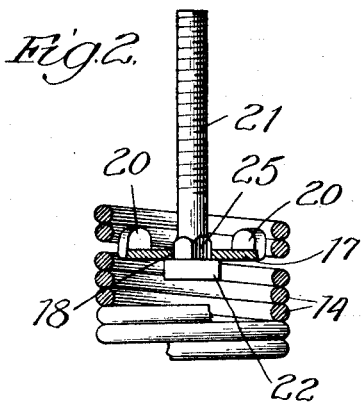
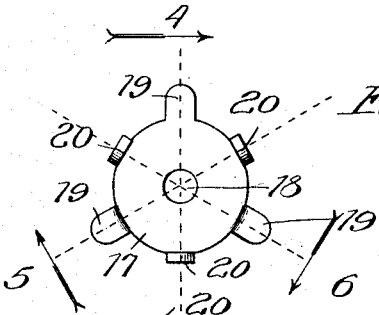
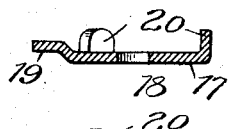
Witnesses:
Inventor:
Harley A. Ogle,

UNITED STATES PATENT OFFICE.

HARLEY A. OGLE, OF CHICAGO, ILLINOIS, ASSIGNOR TO THE AMERICAN CUTLERY CO., OF CHICAGO, ILLINOIS.

COILED-SPRING-ATTACHING MEANS.

1,042,718.      Specification of Letters Patent.      Patented Oct. 29, 1912.

Application filed May 6, 1912. Serial No. 695,355.

*To all whom it may concern:*

Be it known that I, HARLEY A. OGLE, a citizen of the United States, residing at Chicago, in the county of Cook and State of Illinois, have invented a new and useful Improvement in Coiled - Spring - Attaching Means, of which the following is a specification.

My invention relates more particularly to the fastening means for the coiled springs usually employed in spring-scales.

It is usual in a scale of this type to provide an adjustable connection between one end of the spring and the casing of the scale, and it is to improvements in such fastening means that my invention more particularly relates.

It is desirable that the fastening means for the spring be so constructed that the latter, when positioned in the scale, will be held against shifting laterally on its attaching means as such movement of the spring impairs the accuracy of the scale, my object being to provide a construction of attaching means which will hold the spring against such objectionable shifting movement.

I have illustrated my improved attaching-means in connection with a scale of a particular construction, namely, that forming the subject-matter of United States Letters Patent No. 918,777, granted to Morris Schwartz, though I do not wish to be understood as intending to limit it to its use in this construction, as it is useful in connection with many other types of scales, as will be manifest to those skilled in the art; my desire and intention being to claim the novel features of my invention for use in all situations in which they may be useful.

Referring to the accompanying drawings—Figure 1 is a view in vertical sectional elevation of the upper end of the scale forming the subject-matter of the said patent, provided with spring-attaching means constructed in accordance with my invention. Fig. 2 is a view in vertical sectional elevation of the upper end of the spring and its attaching-means. Fig. 3 is a top plan view of the disk forming a part of my improved attaching-means; and Figs. 4, 5 and 6, sections taken at the lines 4, 5 and 6, respectively, on Fig. 3 and viewed in the directions of the arrows.

The casing, of the scale, represented at 10 is provided with a dial 11 and contains the lever-mechanism 12, a portion only of which is shown and to which the beam 13 of the scale and the coiled spring 14, usually provided, are attached. The spring 14, as is common in spring-scales, is adjustably connected at its upper end with the casing 10 and is secured, as indicated at 15, to a projection 16 on the beam 13.

The means for attaching the spring 14 to the casing 10 to permit of the adjustment of the tension of the spring 14, externally of the casing, and which means are constructed in accordance with my invention, preferably comprise a disk 17 containing a central opening 18 and provided with laterally extending lugs 19 and upwardly extending inset lugs 20, the latter arranged in a circular series; a stem-portion 21 in the form of a threaded-shank which extends through the disk and is provided with a head 22 at its lower end against which said disk preferably seats, and an adjusting nut 23, which is secured upon the threaded upper end of the shank 21, the latter extending up through an opening 24 in the top of the casing 10 and the nut 23 seating against said casing-top.

The disk 17, which is preferably formed integrally, fits inside of the spring 14, and its lugs 19 and 20 are so positioned and proportioned that the lugs 20 will snugly fit the interior of the spring and the lugs 19 will extend between convolutions of the spring, as illustrated, between which the disk 17 is clamped by the pressure of the spring, the lugs 19 being successively graduated in height above the body of the disk 17 in order that the latter be positioned in the spring coil at substantially a right angle to the direction of movement of the spring in expanding or contacting.

The hole 18 in the disk 17 may be made round, if desired, and upon assembling it with the stem 21, which latter has a square section 25, may be forced into the opening 18 to cause its corners to become embedded in the wall of the opening 18 and thus prevent the turning of the stem 21 on the disk.

It will be understood from the foregoing that the lugs 20 serve to prevent the shifting of the spring 14 or disk 17 laterally of each other, and thus inaccuracy of weighing from this cause is avoided.

What I claim as new and desire to secure by Letters Patent, is—

1. In a weighing-scale employing a coiled-spring, spring-attaching means comprising a disk interposed between convolutions of the spring, a threaded stem operatively connected with said disk and extending through the casing of the scale, a nut on the protruding threaded end of said stem, and lugs on said disk, extending at an angle thereto and located within said spring and adjacent to the inner surface thereof, for the purpose set forth.

2. In a weighing-scale employing a coiled-spring, spring attaching means comprising a disk provided with laterally-extending lugs interposed between convolutions of the spring, a threaded stem operatively connected with said disk and extending through the casing of the scale, a nut on the protruding threaded end of said stem, and lugs on said disk and extending at an angle thereto and located within said spring and adjacent to the inner surface thereof, for the purpose set forth.

3. In a weighing-scale employing a coiled-spring, spring-attaching means comprising a disk interposed between convolutions of the spring, a threaded stem operatively connected with said disk and extending through the casing of the scale, a nut on the protruding threaded end of said stem, and upwardly-extending lugs on said disk and located within said spring and adjacent to the inner surface thereof, for the purpose set forth.

4. In a weighing-scale employing a coiled-spring, spring-attaching means comprising a disk provided with laterally extending lugs interposed between convolutions of the spring, a threaded stem operatively connected with said disk and extending through the casing of the scale, a nut on the protruding threaded end of said stem, and upwardly-extending lugs on said disk and located within said spring and adjacent to the inner surface thereof, for the purpose set forth.

5. In a weighing-scale employing a coiled-spring, spring-attaching means including a disk interposed between convolutions of the spring, provided with laterally-extending lugs graduated in height above the body of the disk and interposed between convolutions of the spring, and means for preventing the spring from shifting on said disk.

HARLEY A. OGLE.

In presence of—
E. D. STEELE,
O. C. AVISUS.

Copies of this patent may be obtained for five cents each, by addressing the "Commissioner of Patents, Washington, D. C."